(12) United States Patent
Costa

(10) Patent No.: US 7,231,281 B2
(45) Date of Patent: Jun. 12, 2007

(54) DYNAMIC CONTROL SYSTEM FOR POWER SUB-NETWORK

(75) Inventor: Brian Costa, Charlottesville, VA (US)

(73) Assignee: Costa Enterprises, L.L.C., Crozet, VA (US)

( * ) Notice: Subject to any disclaimer, the term of this patent is extended or adjusted under 35 U.S.C. 154(b) by 234 days.

(21) Appl. No.: 11/011,915

(22) Filed: Dec. 14, 2004

(65) Prior Publication Data

US 2006/0125422 A1 Jun. 15, 2006

(51) Int. Cl.
*G05D 3/12* (2006.01)
(52) U.S. Cl. .............. 700/286; 700/295; 700/297; 703/18; 307/31
(58) Field of Classification Search .......... 700/7, 700/12, 286, 287, 297, 291, 295; 307/31, 307/38, 115, 126, 39; 315/307, 362, 294; 703/18, 21
See application file for complete search history.

(56) References Cited

U.S. PATENT DOCUMENTS

| | | | |
|---|---|---|---|
| 5,684,710 A * | 11/1997 | Ehlers et al. | 700/293 |
| 6,181,985 B1 | 1/2001 | O'Donnell et al. | |
| 6,528,957 B1 * | 3/2003 | Luchaco | 315/307 |
| 6,828,695 B1 | 12/2004 | Hansen | |
| 6,907,321 B2 * | 6/2005 | Kearney et al. | 700/292 |

OTHER PUBLICATIONS

Steven D. Braithwait and Kelly Eakin, Laurits R. Christensen Associates, Inc, "The Role of Demand Response in Electric Power Market Design" Oct. 2002.
Hirst, Eric, and Kirby, Brendan, "Retail-Load Participation in Competitive Wholesale Electricity Markets", Edison Electric Institute, Washington, DC, Jan. 2001.
Hirst, Eric, "Expanding U.S. Transmission Capacity", Edison Electric Institute, Washington, DC, Jul. 2000.
Smith L et al: "A Jini Lookup Service for Resource-Constrained Devices" Proceedings. IEEE International Workshop on Networked Appliances, Jan. 15, 2002, pp. 135-144, XP001121564.

* cited by examiner

*Primary Examiner*—Haissa Philogene
(74) *Attorney, Agent, or Firm*—Jessica Costa

(57) ABSTRACT

A dynamic power control system for controlling power utilization on a local level in a power sub-network of a power grid is presented. The power sub-network is configured with switchable power nodes, each having an associated priority level and each having a switch element that operates to switch coupling and uncoupling of first and second subsets of power lines in the sub-network. A sub-network controller monitors utility information that is associated with one of a plurality of system priority levels each of which is associated with one of a plurality of switch state configurations of the respective switch states of the switchable power nodes in the power sub-network, and effects the switch states of the switchable power nodes to comply with the switch state configuration associated with the received utility information.

26 Claims, 7 Drawing Sheets

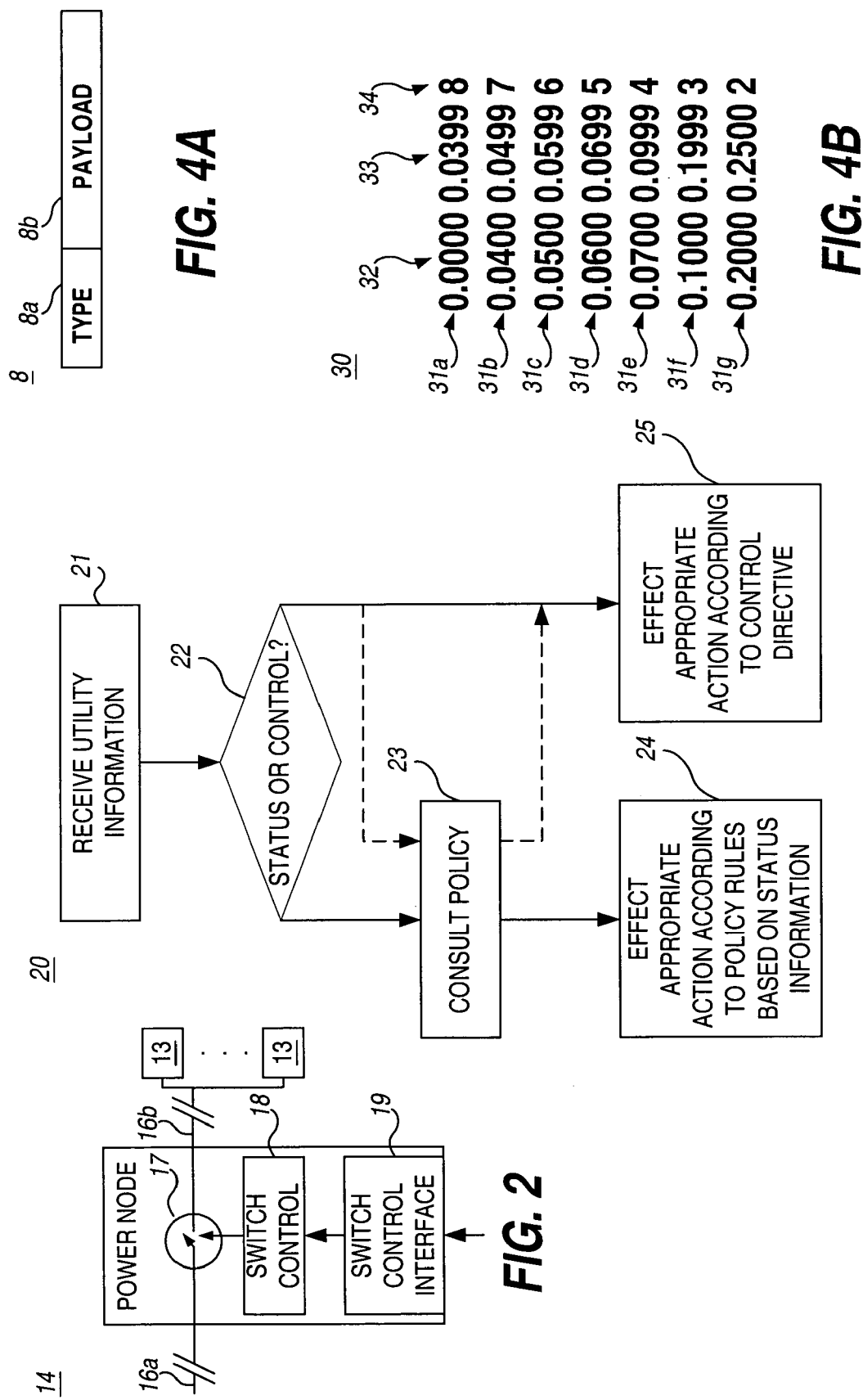

DYNAMIC CONTROL SYSTEM FOR POWER SUB-NETWORK

BACKGROUND OF THE INVENTION

The present invention relates generally to power utilization and more particularly to a method and apparatus for controlling power utilization in a power sub-network of a power grid based on external global power parameters.

Large-scale electrical power distribution occurs over what is known in the industry as a power grid. More particularly, a power grid is an expansive network of high-voltage power transmission lines interconnected at hundreds of power generating stations and distribution substations. The stations and substations are typically owned by various utility companies, which manage distribution of power to various sectors of the grid, including distribution of power to consumers over lower-voltage power lines that are stepped-down via transformers. The substations essentially operate as power hubs, directing current from branches with power surplus to branches needing additional power. The power substations thus operate to attempt to equalize distribution of power across the sectors of the grid and to allow the utilities to buy and sell electricity from each other. Substations may also transform some of the power to a lower voltage level and direct it onto lower-voltage distribution lines that service local sectors. End consumers in the local sectors are fed through service lines that are connected to the lower-voltage distribution lines.

Ohm's law is a basic law of the relationship between voltage, resistance, and current. The relationship can be expressed as $I=V/R$ (or current=voltage divided by resistance). This means that there is an inverse relationship between resistance and current, assuming the voltage is held constant. In a discussion of how electricity is delivered from the electrical power grid to the consumers of that electricity, it is a fair statement to say that it is the intent of the electrical utility to provide a constant voltage for the electrical service delivered to the consumers, and as much current as consumers desire. It is also true that the consumers dictate the quantity of current being drawn at the intended voltage by varying the load (1/resistance) that the overall power grid experiences through the switching on or off of electricity consuming devices such as lamps and motors. As a result, in view of the fact that voltage is intended to be fixed by the utilities and that consumers dictate the load based upon their usage, that the current being drawn can be viewed as the dependent variable in this relationship.

The electrical power grid is designed to be a balanced system encompassing a number of power providers whose contributions vary as necessary in order to meet the overall current requirements of the electricity consumers. The grid or transmission infrastructure can be viewed, for the purposes of this patent, as a number of adjacent transmissions lines linking the electricity producers and consumers, and over which the current is carried. For the purposes of this patent, the transmission lines refer to all of the components that are not part of the electricity producer, not part of the electricity consumer, and that are necessary for carrying current between the producers and consumers.

By design, these adjacent or effectively parallel transmission lines divide and balance the carrying of the current necessary to satisfy the consumers load, or demand, such that no individual transmission line is damaged by attempted to carry an amount of current in excess of its current carrying capacity.

There are typical two approaches taken by the utility service to react to a situation where a transmission line is experiencing excessive current. The first approach is to employ a current limiting device in series with the system load. These devices typically react to increases in heat from the overloading transmission line and become increasingly resistive to current flow as the temperature of the transmission line increases. Use of devices like these limits the current being carried over the transmission line, but results in either adjacent transmission lines having to carry more current to meet effective demand, or in the consumer experiencing decreased voltage at their location. Decreased voltage at the consumer's site is not acceptable since it can damage voltage sensitive equipment that is expecting the voltage of the electrical service to remain within reasonably tight acceptable limits.

The second option to react to excessive current on a transmission line is to disconnect the transmission line that is overloading via the use of a manual or automated control device before damage to the transmission line can occur. Unfortunately this approach has two negative side effects. First, when one of the adjacent transmission lines between the producers and the consumers of electrical current is disconnected, whether intentionally or due to a fault, it places a greater current burden on the remaining adjacent transmissions lines. This additional current is know as a fault-current, and follows from Ohm's law which dictates that the full current required to satisfy the demand still be delivered (assuming voltage is to be held constant), and is therefore divided over the remaining transmission lines as necessary to achieve this. In this scenario, each of the adjacent transmission lines will now be carrying an amount of current that is greater than the current it carried prior to the fault having occurred—thus, their proportion of the total current they carry increases.

As the adjacent lines near the point of overloading, automated controllers disconnect them from the grid, increasing the number of fault-current loads on other lines exponentially. If not controlled properly, disconnecting transmission lines that are overloaded can thus result in a cascading failure of the entire transmission system as the same total current is attempted to be carried over a reduced number of available transmission lines, possibly causing other transmission lines to become overloaded themselves and shutdown.

The objective to shutting down an overloaded transmission line is two-fold. First, it is to protect the transmission line and its components from damage resulting from the excessive current and resultant heat. The second reason is that often by shutting down a transmission line, the load will be disconnected from the electrical grid, which will reduce the current required to satisfy the remaining load connected to the grid. This is a pruning of the power demand in order to reduce the current to within levels that the transmission lines can support.

This approach to addressing the problem suffers from the fact that the granularity at which the electrical grid can prune itself is extremely coarse. Typically the granularity is at the neighborhood or regional scale, but in the case of the blackouts of 2003, the scale of the blackouts became much greater.

There are two fundamental ways to address the issue of excessive current through parts of the transmission system. The first is to increase the current carrying capability of the transmission system. This approach faces several challenges including resistance at the state and local regulatory levels, significant expense, and difficulty gaining right of way for expansion of the transmission system.

The second approach is to reduce the electrical demand during times of excessive current draw. Reducing demand proportionally reduces the current required, and reduces the risk of damage from excessive current on the existing transmission system. These approaches are not mutually exclusive. Voluntary reductions in demand are attempted through the use of "realtime pricing" or "demand pricing". With demand pricing, there is a financial disincentive to using power during high use periods. Clearly this approach can, at best, only have a probabilistically positive effect on current draw, and at the present time could not be depended upon as a means to control current draw during an unforeseen incident such at the blackouts of 2003.

Accordingly, it would be desirable to have a technique for enabling the control of electrical demand at a much finer granularity and in a much more selective way, than previously possible. As a result, during an electrical disturbance, operators of the electrical grid would be able to request the reduction of electrical load as necessary to reduce the current on the transmission lines in an automated way with the result being that load is reduced according to the electricity consumers preferences for what is shutdown.

It would also be desirable to have a technique for allowing electricity consumers to fully take advantage of the increasing trend in "realtime electricity pricing", or "demand electricity pricing". In realtime or demand electricity pricing, the price for electrical power is adjusted many times over the course of the day to better reflect the true cost of electricity production and transmission rather than being set less frequently based on averaging models. The advantage of this approach would be that it allows consumers to adjust their consumption in response to changes in pricing. However, in order to take full advantage of this approach, the consumers need to be made aware of these price changes, and have a means for quickly adjusting their consumption in response to the changes in price. This invention allows consumers to respond in an automated fashion to rapid changes in the price of electricity. This ability provides potentially significant savings for consumers, and can significantly reduce the peak electricity demand as seen by the electricity producing utilities. If peak electricity demand is reduced, then the current carrying capabilities of the electricity transmission system are also reduced.

Separately, the utility companies, recognizing that there is a market for providing fast Internet services to households, are endeavoring to provide Internet service using the power system wiring. To achieve this, several technologies have been invented, referred to as Broadband Power Line (BPL) technologies, which use the existing Utility Service power lines to provide a data communication channel that can be used to provide Internet access to a customer. BPL technologies are primarily intended to be inter-premises technologies. They are designed to provide Internet access to the home or business, in the same way that DSL and Cable networking companies currently do.

Separately, intra-home networking is popular, but prior to the availability of wireless networking, required wiring the premises for data using one of several cable standards that are well known to someone skilled in the art.

There are existing products available for utilizing the existing premises electricity wiring for the purposes of home networking. Some of these products are based on the Home-Plug standard. Products are available that allow one to bridge Ethernet communications into the HomePlug network which utilizes the electrical wires in the house. These bridges are plugged into a wall outlet, and provide a standard 10-Base-T or 100-Base-T RJ-45 connector to connect the computer to. By utilizing two of these devices, the computers are networked, with the communications path taking advantage of the existing in-house, or "premises", wiring. HomePlug enables the use of the premises electrical wiring to allow a communications network within the premises electrical network.

SUMMARY OF THE INVENTION

As used herein, the term "utility" is meant to include all components necessary to bring electricity to a consumer up to and including the power meter where the electricity is measured at the consumer's site. The term "premises wiring", as used herein, refers to all components necessary to deliver the electricity from the electrical meter to the consumer's electrical devices. Premises wiring would then include the service coming into the site from the meter, the main electrical panel and any electrical sub-panels, and the site wiring, outlets, switches, and fuses, etc. The demarcation between the "utility" and "premises" wiring is presented herein for simplification of concept only and not limitation, and is not necessary for the invention.

According to one aspect of the invention, a system is provide which allows the electricity consumer to assign identification to each electrical outlet or circuit in the premises, and to develop a set of rules to govern the turning on or turning off of each identified outlet or circuit. The rules would include external information, some of it coming from the utility company, during their evaluation. Examples of information that might come from the utility company would include the current cost of electricity, or whether a disturbance was occurring, and how much the load needs to be reduced by to address the disturbance. Other information could be used as well. Information from other external sources such as governmental agencies (e.g., the Office of Homeland Security), or from remote communication devices such as sensors, could be included in the information used when the rules are evaluated.

These rules are collectively referred to as a "policy". The policy is continually or intermittently processed, and this processing results in the appropriate outlets being turned on, or off, as specified by the evaluation of the policy.

In one embodiment, the invention includes a processing node at each outlet, with one of the processing nodes being responsible for processing the policy and communicating directives to the other processing nodes. The node responsible for processing the policy and the external data may be called a master controller. In this approach, techniques for assuring the robustness of the master controller process or system would be employed such as fail over or leader election of the master controller, or other techniques know to those skilled in the art of distributed computing, to ensure the robustness of the system.

In this embodiment, the invention implements or utilizes a communication system between the external information sources such as the utility company and the master controller in the premises sub-network that takes advantage of the connectivity of the power lines in the power grid. As an example, the emerging Broadband Power Line standard may be employed to allow communications between the utility company and the master controller. Other communications mechanisms could be used as well, but utilization of the power lines coming to the consumer would be most convenient. This communications system would be used for either unidirectional or bi-directional communications between external resources and the master controller. In the case of unidirectional communications, the external resources would provide data or information that was evaluated in the processing of the policy. In bi-directional communication, the master controller would be able to communicate information back to the external resources.

The invention would also implement a premises communications system between the master controller and the other processing nodes at the outlets, or in the circuits. The premises communications system might be the same, or different than, the utilities communications system used to communicate between the external entities and the master controller. The purpose of the premises communications system is for bi-directional communications to allow the master controller to control the other processing nodes, and for the other processing nodes to communicate information to the master controller. Ideally, the premises communications system would use the premises electrical wiring as the physical layer of the communications system, and would be based on accepted communications standards for use of the premises wiring, such as the HomePlug standard.

According to another aspect of the invention, a system is provided that would allow refinement of the granularity with which a utility company or other entity can control power usage in sub-networks of a power grid. Whereas, prior to the invention, utility companies only had the ability to control power delivered to relatively large regions, or at best individual controllable power meters, the present invention provides the utility companies with the capability of controlling the consumer's power demand with granularity down to specific outlets or circuits in power sub-networks that implement the system of the invention. Additionally, because the control is dictated by a user specifiable policy, the users preferences are respected with regard to what outlets or circuits are disabled when necessary.

Clearly, it would also be beneficial to provide a mechanism for the external entities to force the turning off of outlets and circuits as necessary. By communicating information such as the existence of a power disturbance that requires all non-essential power consumption be stopped, and assuming a policy that specifies rules that would cause the disconnection of outlets identified as "non-essential", and thus to remove their load from the cumulative electrical load, this system allows the utility service to effect a significant reduction in the electrical load in a very short time-frame through an automated means while respecting the preferences of the electricity consumers.

Additionally, as electrical utilities are moving to demand pricing, this invention can be used to optimize the consumer's electricity consumption. Assuming a demand pricing system where the current price of electricity is provided to the system implementing the invention, and a policy that specifies the turning off of non-essential outlets as electricity prices increase and the turning on of desirable outlets when prices decrease, the invention provides a system that decreases the consumption of electricity as the demand price increases, and visa-versa in an optimal, automated process.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 is a schematic block diagram of a switchable power node of the invention;

FIG. 3 is a flowchart illustrating operation of the dynamic power control system;

FIG. 4A is a packet format of a packet implementing a preferred embodiment of the content of utility information in accordance with the invention;

FIG. 4B is a policy lookup table implementing a policy configuration format;

DETAILED DESCRIPTION

1. General Embodiment

Figure 1:
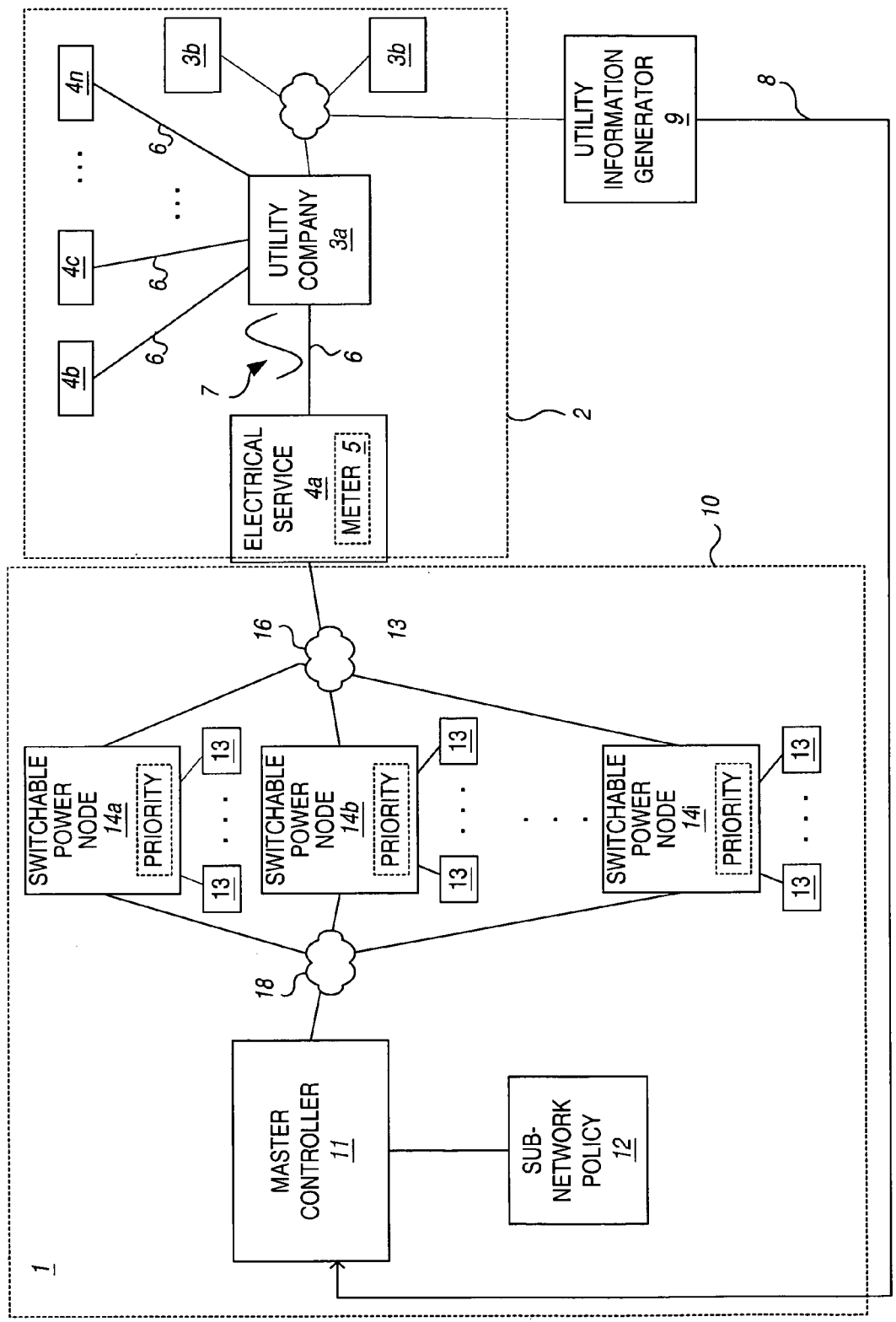
FIG. 1 is a block diagram of a system that utilizes a dynamic power control system in accordance with the invention.

Turning now to the drawings, FIG. 1 is a block diagram of a system 1 that utilizes a dynamic power control system 10 in accordance with the invention. In this system 1, a power grid 2 is serviced by a utility company 3. The utility company 3 provides electrical service 4a–4n to a plurality of entities (not shown) through an electrical service unit. More particularly, the utility company 3 supplies power 7 over regional and local power lines 6 up to and including the electrical service units 4a–4n (typically implemented by way of an electrical service meter 5). A power sub-network 10 distributes power beyond the electrical service unit over a sub-network of power lines 16 (e.g., premises wiring). The use of power within the power sub-network 16 can be dynamically controlled using the dynamic power control system 10 of the invention.

Implementation of the dynamic power control system 10 of the invention requires utility information 8 generated by the utility company 3 or some other external entity (e.g., a homeland security network site, not shown), one or more switchable power nodes 14a–14i to be monitored by the system 1, a master controller 11 which receives the utility information 8 and ultimately controls power delivery to devices serviced by the various switchable power nodes, and a power usage policy 12 which defines a set of power usage control rules that the master controller 11 is to effect within the system 10 based on associated system conditions.

Although shown for convenience as a separate entity in FIG. 1, any switchable power node 14a–14i can itself act as the master controller 11 as long as it can monitor the utility information 8, has access to the policy 12, and can effect opening and closing of the switches in each of the switchable power nodes 14a–14i being monitored by the system 10 via some sort of communication link 18 to the other switchable power nodes 14a–14i. Furthermore, the master controller 11 need not be fixed. For example, some protocols (e.g., Infiniband) allow any networked processing node to act as master through an arbitration protocol. A similar arbitration protocol could be used at the application layer of the invention to allow for failover and robustness of the master controller. Alternatively it is also possible to develop an embodiment where all switchable power nodes 14a–14i are considered "peers" (meaning there is not identified master controller), and each switchable power node 14a–14i is responsible for interpreting the policy and setting its own state appropriately. This approach would eliminate a single point of failure in the architecture. For simplicity, the illustrative preferred embodiment is described as having a single, fixed, master controller 11 and a plurality of switchable power nodes 14a–14i.

A representative switchable power node 14 is shown in block diagram form in FIG. 2. A switchable power node 14, as defined herein, comprises (1) a switch element 17 that can electrically connect or disconnect one or more power lines 16 input to the switch element 17 in-line with the sub-network wiring 16; (2) an electronic/electro-mechanical control mechanism 18 that actuates the switch element 17; and (3) a switch control interface 19 for activating the control mechanism 18 to actuate the switch element 17 to connect or disconnect the power lines 16 input to the switch element 17. A switchable power node 14a–14i can be implemented anywhere along the sub-network power wiring, for example, at power outlets, at junction boxes, at switches, at power breakers or fuses, or anywhere in-line with the sub-network wiring. If located at a power outlet, the switchable power node 14 may be implemented as a unit that is plugged into one of the outlet sockets, or may be hard-wired in-line with the power lines going into the outlet box. Various implementations of the switchable power node 14 will be presented hereinafter.

As previously described, the master controller 11 receives utility information 8 generated by the utility company 3 or some other external entity. Based on the utility information 8 received and the power usage policy 12, the master controller 11 controls power delivery to devices serviced by the various switchable power nodes 14a14i by effecting the switch position (power connected or power disconnected) of the various switchable power nodes 14a–4i monitored by the dynamic power control system 10.

a. Communication Between Utility Company/External Entity and Master Controller i. Content of Utility Information Communication between master controller and electrical utility service (or other external service such as a homeland security service) is dictated by the service. The content of the utility information 8 may include many types of information. In the illustrative embodiment, it is contemplated that the utility information 8 will include at least one of two types of information: 1) status information (for example electricity rate information, which will change dynamically), and 2) control directives (for example, commands to turn off all switchable power nodes except nodes above a certain priority).

FIG. 3 is a flowchart illustrating operation 20 of the dynamic power control system 10. As illustrated, utility information 8 is received from the utility company 3 (or other entity) (step 21). In the preferred embodiment, the utility information 8 may contain status information or control directives. Accordingly, when utility information 8 received, a determination is made (step 22) as to whether the utility information 8 contains status information or a control directive. If the utility information 8 contains status information, the policy 12 is consulted to determine whether any action need be taken based on the received utility information 8 (step 23). To this end, if the utility information 8 affects any conditions on which the policy 12 requires that action be taken, the master controller 11 effects appropriate action (step 24), turning on or off the various monitored switchable power nodes 14a–14i according to the policy rules. If the utility information 8 is determined to contain a control directive (as determined in step 22), the system requires that action represented by the control directive be taken regardless of the policy 12. Accordingly, the master controller 11 effects appropriate action (step 25), turning on or off the various monitored switchable power nodes 14a–14i according to the received control directive.

Of course, the encoding and format of the utility information 8 depends upon the physical transport of the information, discussed hereinafter. However, in general, the utility information 8 is recoverable from a transmission channel into a form shown in FIG. 4A. As shown therein, the utility information 8 comprises a type field 8a and a payload field 8b. The content of the type field 8a indicates whether the payload field 8b contains status, a control directive, or other content type (not discussed herein).

As just outlined, in the case that the type field 8a of the utility information 8 indicates that the payload 8b contains status information, the master controller 11 consults the policy 12 to determine whether and how the status information should affect the system configuration (i.e., which switchable power nodes 14a–14i should be connected to provide power and which should be disconnected to remove power from the devices it serves). In an illustrative embodiment, suppose the utility company 3 implements a dynamic utility rate that is based on current electricity demand and that the utility information 8 is status information containing realtime changes in electrically rate information so that the master controller 11 can implement rate-based policy. Preferably, the policy 12 includes a set of rules allocating the switchable power nodes 14a–14i being monitored by the system 10 to various rate categories. For example, a first subset of the switchable power nodes 14a–14i in the power sub-network 10 may be assigned a priority level 1, a second subset of the switchable power nodes 14a–14i in the power sub-network 10 may be assigned a priority level 2, a third subset of the switchable power nodes 14a–14i in the power sub-network 10 may be assigned a priority level 3, and so on in order of importance of the devices connected to the switchable power nodes 14a–14i, where priority level 1 is the highest priority level, priority level 2 is the second highest priority level, and so on. Accordingly, given the electrically rate information contained in the received utility information 8, the master controller 11 determines from the policy 12 that the rate falls within one of the priority levels. The master controller 11 then effects turning off all switchable power nodes 14a–14i being monitored by the system 10 that have associated priority levels below the priority level associated with an electricity range that the current electricity rate falls within, and effects turning on all switchable power nodes 14a–14i having associated priority levels in or above the priority level associated with the electricity range that the current electricity rate falls within. In other words, an electricity rate change may trigger switchable power nodes 14a–14i to be turned on or off by the dynamic power control system 10.

As an example, suppose that the utility information 8 is status information containing rate information indicating that the rate is $0.0638/KW-hour. Suppose further that the policy 12 includes rules allocating switchable power nodes to various rate categories, implemented as a simple lookup table 30 as illustrated in FIG. 4B. In this policy lookup table 30, each line represents a rate range and a corresponding priority level. Each line in the policy lookup table 30 comprises three parameters delineated by a space. The first parameter indicates the lowest value in a given rate range, the second parameter indicates the highest value in the given rate range, and the third parameter indicates the lowest priority level that should be powered in the sub-network (i.e., all switchable power nodes having a priority level below that listed in the lookup table 30 for the current rate range should be switched to disconnect power through the switch). In the example policy lookup table 30, a rate range between 0 and 0.0399 kWh corresponds to a priority level of 8. Similarly, a rate range between 0 and 0.0399 kWh corresponds to a priority level of 8; a rate range between 0.0400 and 0.0499 kWh corresponds to a priority level of 7; a rate range between 0.0500 and 0.0599 kWh corresponds to a priority level of 6; a rate range between 0.0600 and 0.0699 kWh corresponds to a priority level of 5; a rate range between 0.0700 and 0.0999 kWh corresponds to a priority level of 4; a rate range between 0.1000 and 0.1999 kWh corresponds to a priority level of 3; and a rate range between 0.2000 and 0.2500 kWh corresponds to a priority level of 2. No line exists for a rate corresponding to a priority level of 1, because at least in this example policy, circuits on a priority level 1 switchable power node are considered to be critical and should never be shut down.

Preferably, the various switchable power nodes 14a–14n in the system 10 are assigned a priority level according to the level of importance of the devices connected down-line from a power node. (In this context, a device that is "down-line" from a given switchable power node means that power flow can be cut off from the device by switching the switchable power node to its isolated position and power can be restored to the device by switching the switchable power node to its connected position.

In the illustrative example, the current electricity rate is $0.0638/KW-hour. The current electricity rate falls within the rate range 0.0600 to 0.699, which corresponds to priority level 5. Accordingly, all switchable power nodes 14a–14n with a priority level of 5 or greater are to be switched on (i.e., to provide an electrical connection), and all switchable power nodes 14a–14n with a priority level below 5 are to be switched off (i.e., to provide electrical isolation). In the given illustrative example, the master controller 11 effects turning off all switchable power nodes assigned to priorities 3 through 5, and turning on all switchable power nodes (if not already on) assigned to priorities 1 and 2.

in the case that the type field 8a of the utility information 8 indicates that the payload 8b contains a control directive, the master controller 11 effects the appropriate action defined by the control directive. In the illustrative embodiment, the master controller 11 must respect these control directives regardless of whether they conflict with the policy 12 because in the contemplated use, control directives are only issued in emergency situations. (Of course, it will be appreciated that in alternative embodiments, control directives may be issued for other reasons or in non-emergency situations). For example, in the power blackouts of 2003, it was determined that the utility companies had only a very small time window in which to significantly reduce demand in the regions affected in order to prevent a problem. By implementing control directives that override the power sub-network policy 12, a utility company 3 will be able to turn off switchable power nodes 14a–14i below a critical or important priority level in an automated fashion in order to meet this stringent time limitation and avoid a power blackout.

As an illustrative embodiment, someone skilled in the art is capable of building a device which, as the temperature of the transmission line increases above a certain threshold temperature that indicates excessive current on the transmission line, triggers the execution of a computer program running on a computer processor that generates and communicates the appropriate control directives that causes the invention to turn off an appropriate number of electrical devices and causes reduction in electrical load sufficient to reduce the current on the transmission line and avoid damage to the line.

ii. Physical Transport of Utility Information to Master Controller

Various methods exist to communicate utility information 8 to the master controller 11 of a dynamic power control system 10.

In one preferred embodiment, the utility information 8 is presented on the power grid power lines 6 coming into the power sub-network 10 at the electrical service 4a that pass through the meter 5. In this preferred embodiment, the utility information 8 is transmitted using a power communication protocol. In the preferred embodiment, the power communication protocol is the industry standard under development by the United States Federal Communications Commission (FCC) known as Broadband Power Line (BPL), capable of delivering IP-based broadband services over the electric power lines. In this embodiment, the system 10 requires a BPL modem designed to send and receive signals over electric power lines (much like cable and DSL modems send signals over cable and telephone lines). Access BPL carries broadband Internet traffic over medium voltage power lines (e.g., the power lines seen on top of utility poles that carry several thousand volts). Electric utilities and their service partners can install BPL modems on the electric distribution network. Inductive couplers are used to connect BPL modems to the medium voltage power lines. An inductive coupler transfers the communications signal onto the power line by wrapping around the line, without directly connecting to the line.

BPL Patents to Incorporate by Reference?

Figure 5:
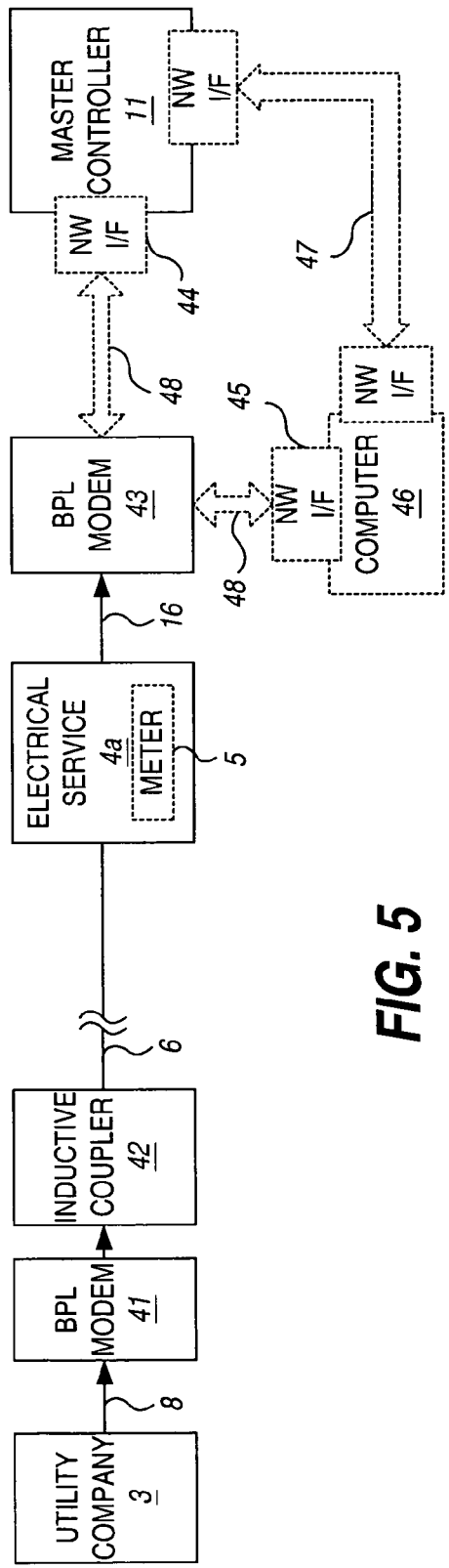
FIG. 5 is a block diagram of a communication channel between a utility information generator and a dynamic power control system using a Broadband Power Line protocol.

FIG. 5 illustrates an example BPL interface between a utility company 3 and the master controller 11 of a dynamic power control system 10. As illustrated, the utility company 3 transfers utility information 8 communications signals onto the grid power lines 6 via a BPL modem 41 in series with an inductive coupler 42. At the dynamic power control system 10 where electrical service 4a is provided to the local power lines 16, a BPL modem 43 is plugged into a socket up-line from the switchable power nodes being monitored (for example, at the service meter 5). A network cable or wireless connection 48 connects the BPL modem 43 to a network card 44 on either the master controller 11 or a network card 45 on an independent computer 46 in communication with the master controller 11 via communication link 47. The BPL modem 43 converts BPL signals into a local network protocol understood by the master controller 11.

In the embodiment of FIG. 5, the utility information 8 is transported directly over the power lines 6, ensuring presentation of the availability of the utility information 8 to all premises sub-networks. However, other methods for communicating utility information 8 to the master controller 11 of a dynamic power control system 10 also exist.

Figure 6:
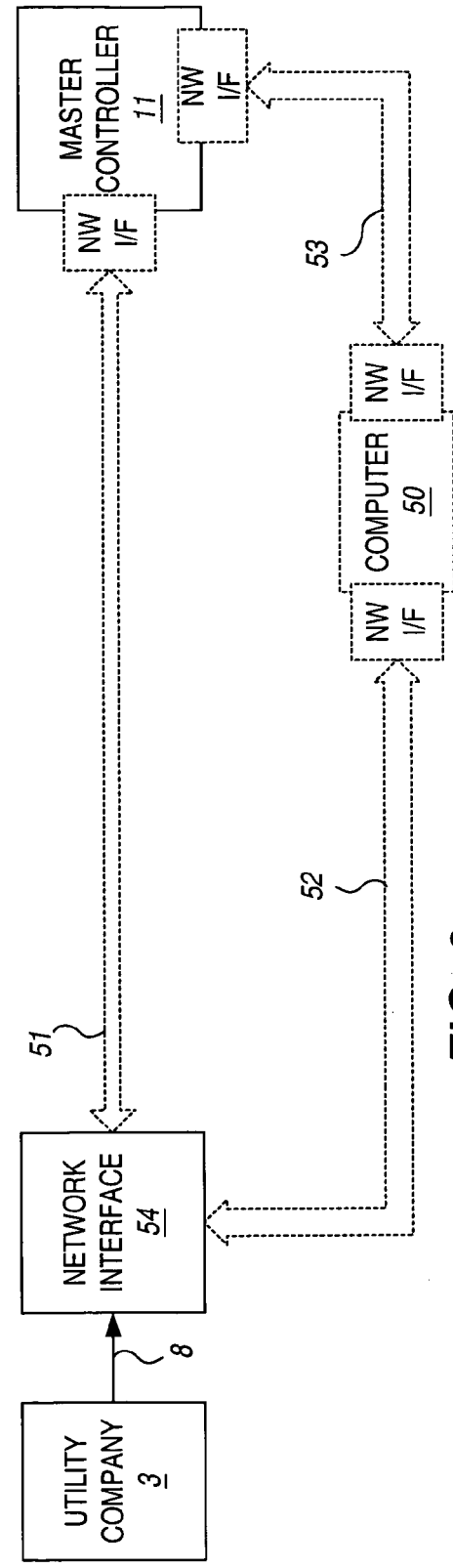
FIG. 6 is a block diagram of a communication channel between a utility information generator and a dynamic power control system using a generic Internet protocol.

In an alternative embodiment illustrated in FIG. 6, the master controller 11 can use DSL, high-speed cable Internet, or other Internet service to receive utility information 8 from the utility company 3. The utility information 8 may pass directly from the utility company 3 to the master controller 11 over a direct Internet connection 51, or pass indirectly through one or more computers 50 via several different Internet connections 52 and 53. Other implementations may be utilized as well, for example, but not limited to cellular telephone technologies, wireless network technologies, etc., and other technologies that will be developed over time. Of importance to any of these various technologies, as is well known by those skilled in the art, is the proper network interface layers that allow different computer systems to talk to one another via the network connection.

In summary, the utility company 3 (or another external entity) sends utility information 8 to the master controller 11 of a dynamic power control system 10. The system is implemented such that the utility information 8 is passed to the master controller 11 in a form recognizable by the master controller 11.

When using a TCPIP network protocol (over any of the physical transport layers), the master controller 11 is identified by an IP address assigned from the utility company (or other entity), similarly to how high-speed internet is provided currently through DSL or cable modems using one of the well-known protocols such as DHCP, static IP addresses, or PPPOE as appropriate.

Preferably, the master controller 11 can communicate with external computers for logging purposes using well-known protocols such as Unix Syslog to create a time-series based log of events.

b. Communication Between Master Controller and Power Nodes

One of the critical functions of the master controller 11 is to implement or execute the power usage policy 12, discussed hereinafter. To this end, based on a combination of the received utility information 8 and the policy 12, the master controller 11 effects the policy 12, for example by sending directives to the switchable power nodes 14a–14n that are monitored by the system 10. Accordingly, the master controller 11 must include a communications interface to communicate with the switchable power nodes 14a–14n to actuate opening and closing of the power node switches.

i. Physical Transport of Control Information from Master Controller to Power Nodes The master controller 11 may communicate with the switchable power nodes 14a–14n either directly or indirectly through one or more intermediate control nodes.

Figure 7D:
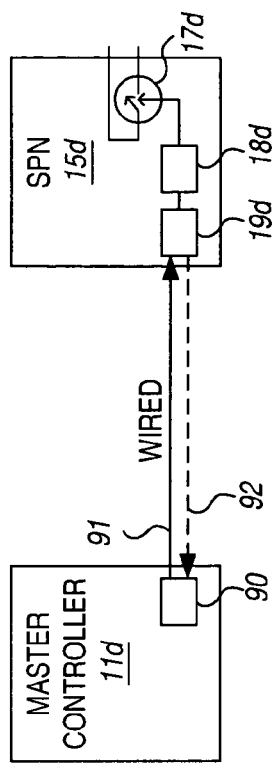
FIG. 7D is a block diagram illustrating the communication channel of FIG. 7A implemented using a wired physical transport protocol.
Figure 7E:
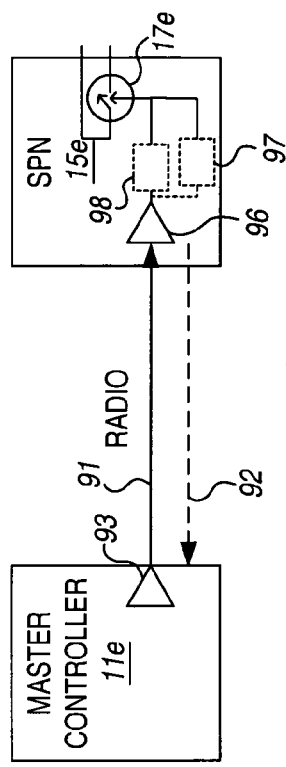
FIG. 7E is a block diagram illustrating the communication channel of FIG. 7A implemented using an analog radio-frequency physical transport protocol.
Figure 7A:
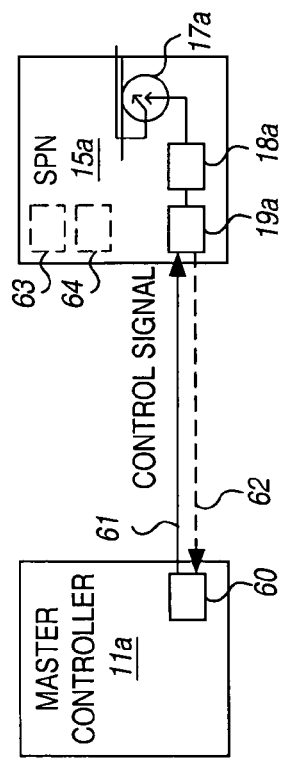
FIG. 7A is a block diagram illustrating a general communication channel between a master controller of a dynamic power control system of the invention and a switchable power node.

FIGS. 7A–7E show various different embodiments for implementing the switchable power nodes 14a–14n. FIG. 7A illustrates direct communication between one embodiment of a master controller 11a and a switchable power node (SPN) 15a. In this implementation, the master controller 11a must be configured with a switch control interface 60 that generates a control signal 61 recognizable by the switch control interface 19a of the switchable power node 15a. The switch control interface 60 must therefore at least be able to transmit a control signal to the switch control interface 19a of the switchable power node 15a in order to cause the switch control 18a to actuate the switch 17a into either a connected position or a disconnected position. In some implementations, the switchable power node 15a may also include a memory 63 which stores a priority level associated with the switchable power node 15a or an electro-mechanical switch 64 whose state indicates the priority level of the switchable power node 15a. In these implementations, it is often required that the switchable power node 15a also be able to return a signal 62 (for example, containing the switchable power node's priority level) to the master controller or to an intermediate control node 99b, as shown in FIG. 8. In this case, the switch control interface 19a of the switchable power node 15a preferably also includes a transmitter for transmitting a signal recognizable by the switch control interface 60 of the master controller 11a or switch control interface of an intermediate control node. Implementation of the prioritization levels of the switchable power nodes 14a–14n is discussed in more detail hereinafter.

Figure 7B:
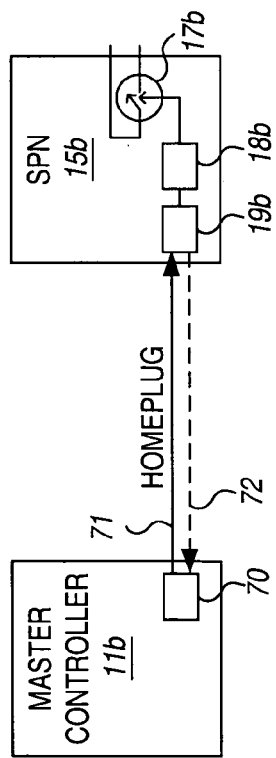
FIG. 7B is a block diagram illustrating the communication channel of FIG. 7A implemented using a power line physical transport protocol.
Figure 8:
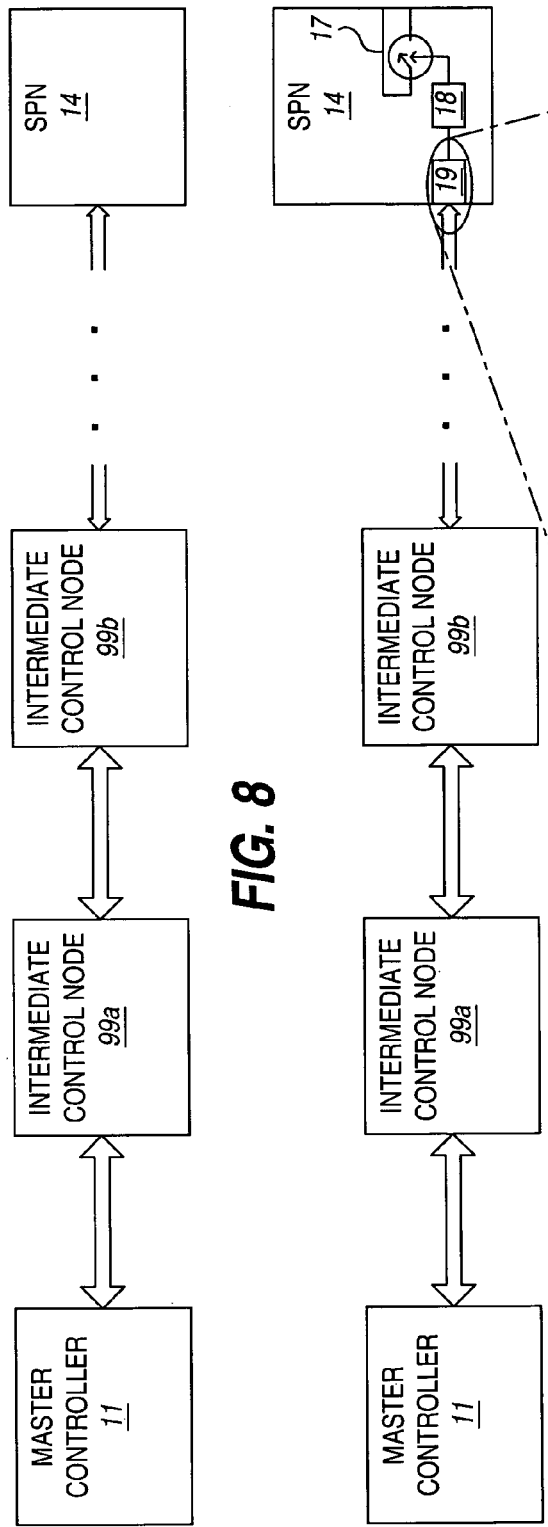
FIG. 8 is a block diagram of a bi-directional communication channel between a master controller of a dynamic power control system of the invention and switchable power nodes through intermediate nodes of the system.

FIG. 7B illustrates a more specific embodiment of direct communication between one embodiment master controller 11b and a switchable power node 15b. In this implementation, a master controller 11b communicates with a switchable power node 15b over the sub-network power lines 16 via a power line physical transport protocol 71 such as HomePlug Powerline developed by the HomePlug Powerline Alliance. In this embodiment, both the master controller 11b and switchable power node 15b are equipped with a power line physical transport protocol interface 70 and 19b, respectively, for example a Cogency HomePlug Powerline ASIC with an analog front end which makes the power line appear like a network connection by translating HomePlug Powerline signals into the local system interface format (MII, PCI, USB, 10Base-T, or others). The switch control circuitry 18b translates the digital output of the HomePlug interface to an analog controller signal that actuates the switchable power node switch 17b.

Figure 7C:
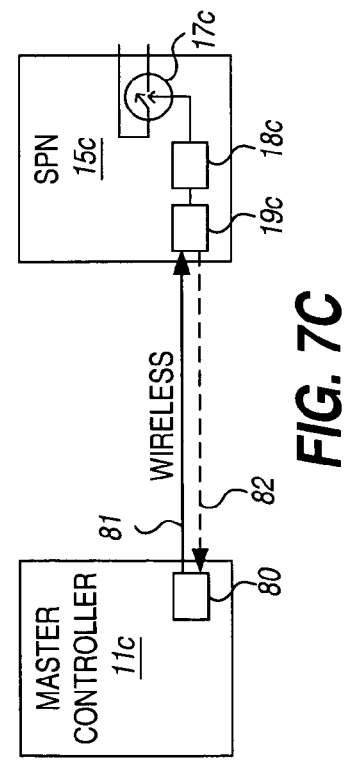
FIG. 7C is a block diagram illustrating the communication channel of FIG. 7A implemented using a wireless transport protocol.

FIG. 7C illustrates another embodiment of direct communication between a master controller 11c and a switchable power node 14c. In this implementation, a master controller 11c communicates with a switchable power node 15c over a wireless connection 81 via a wireless network protocol, for example using the IEEE 802.11 or 802.15 wireless network protocol. In this embodiment, both the master controller 11c and switchable power node 15c are equipped with a wireless interface 80 and 19c, respectively. The switch control circuitry 18c translates the digital output of the wireless interface 19c to an analog control signal that actuates the switchable power node switch 17c.

FIG. 7D illustrates another embodiment of direct communication between a master controller 11d and a switchable power node 15d. In this implementation, a master controller 11d communicates with a switchable power node 15d over a wired connection 91, for example CAT5, co-axial cable, telephone lines, etc., using a wired network protocol such as Ethernet, etc. In this embodiment, both the master controller 11d and switchable power node 15d are equipped with a wired interface 80 and 19d, respectively. The switch control circuitry 18d translates the digital output of the wired interface 19d to an analog control signal that actuates the switchable power node switch 17d.

In yet another embodiment, illustrated in FIG. 7E, a master controller 11e communicates with a switchable power node 15e via radio communication 91. Master controller 11e includes a radio transmitter 90, and its corresponding switchable power node 15e includes a radio receiver 96 that is responsive to control signals 91 generated by the radio transmitter of its corresponding control node. The control circuitry that translates the received signal from the radio receiver 96 into an actuating control signal for actuating the switch 17e may be implemented in analog 97 (for example, a notch filter tuned to a specific actuating frequency) or digitally 98 (for example, using a combination of an analog-to-digital (A/D) converter, and a digital decoder/processor which converts the received analog signal to a digital signal that is decoded and turned into an actuating signal by a processor).

Other master-controller-to-power-node communication schemes may be implemented. What is essential is that the master controller 11 is able to open or close the switch 17 at each switchable power node 14a–14n via a communication control signal. The communication control signal may be any signal that the switch control node (or intermediate node) can recognize and translate into a meaningful instruction for the switchable power node (or pass on to one or more intermediate control nodes that can translate it into a meaningful instrument for the switchable power node).

As briefly mentioned above, communication between the master controller 11 and any of the switchable power nodes 14a–14n may occur through intermediate communication with one or more intermediate control nodes. For example, FIG. 8 illustrates indirect communication between a master controller 11 and a switchable power node 14 via one or more intermediate control nodes 99a, 99b. Each intermediate control node 99a, 99b in the master-controller-to-switchable-power-node communication chain must be able to receive control information from either the master controller 11 or a preceding intermediate control node 99a, 99b in the master-controller-to-switchable-power-node communication chain and pass on the control information to either the switchable power node 14 or a subsequent intermediate control node 99a, 99b in the master-controller-to-switchable-power-node communication chain. The communication links between the nodes 11, 99a, 99b, 14 in the master-controller-to-switchable-power-node communication chain may each use the same or different communication protocols. Example embodiments for various communication protocols, for illustrative purposes only and not by way of limitation, include TCP/IP or ATM as the network protocol layer over Homeplug, Ethernet, or Wireless 802.11 physical transport layers, or radio communication, each described previously with respect to FIGS. 7B–7F.

Additionally, independent of the means by which the master controller communicates with a switchable power node, it is possible for the switchable power node to make the communications available to either the device that is plugged into the switchable power node (in the case of HomePlug style physical transport), or a device that is in reception range of the switchable power node (in the case of a wireless physical transport), or a device that can be connected to the switchable power node (in the case of a wired connection). In this way, the switchable power node can act as both a switchable power node and also an intermediate node in a chain that extends all the way to other devices.

ii. Relative Locations of Master Controller, Intermediate Nodes, and Switchable Power Nodes Each of the master controller and/or intermediate control nodes may be either at or remote from a switchable power node.

c. Prioritization of Switchable Power Nodes

A priority level is assigned (either voluntarily or by default) to each switchable power node 14a–14i to be monitored.

Assigning a priority level to a switchable power node 14a–14i may be accomplished according to one of several implementations. In one embodiment shown in FIG. 9, the switchable power nodes 14a–14i are configured with a mechanical or electro-mechanical priority level setting mechanism 109 that allows a user to manually set the priority level of the switchable power node at the switchable power node itself, utilizing an electro-mechanical switch 106 that may be manually switched by the user at the switchable power node to set the priority level of the respective switchable power node between 1 and 8. The electro-mechanical switch 106 is connected to a set of eight fuses, transistors, resistors, or other switching elements 105. The set of eight fuses, transistors, resistors, or other switching elements 105 are connected on one end to the electro-mechanical switch 106 and on the other end to an 8:3 decoder 104 which translates the eight binary switches to a single hex value. The output of the 8:3 decoder 104 containing the local priority level 107 is hardwired to store the local priority level 107 in a memory location 103, which may be read by a processor 102 in the switch control interface 19 of the switchable power node 14.

In one embodiment, the local priority level 107 is transmitted by the switch control interface communication interface 101 to the master controller 11 via the master controller-to-switchable power node communication chain described above with respect to FIGS. 7A–7F or 8. In this implementation, the master controller 11 knows the local priority level 107 of each switchable power node 14a–14i and can actively effect control of the switches in each of the switchable power nodes 14a–14i.

In an alternative embodiment, the switch control interface 19 is configured to be more intelligent. In this alternative embodiment, the master controller 11 broadcasts commands to all the switchable power nodes 14a–14i, preferably simultaneously, indicating, for example, a minimum priority level at which power should be connected. In this embodiment, a processor 102 is implemented in each of the switch control interfaces 19 which respectively process the broadcast command, compares the local priority level 107 associated with the respective switchable power node 14a–14i to the minimum priority level, and actuates its respective switch 17 to the power connected position if its local priority level 107 is at or above the minimum priority level (if not already in the power connected position), and actuates the switch 17 to the power disconnected position if its local priority level 107 is below the minimum priority level (if the switch 17 is not already in the power disconnected position).

Figure 10:
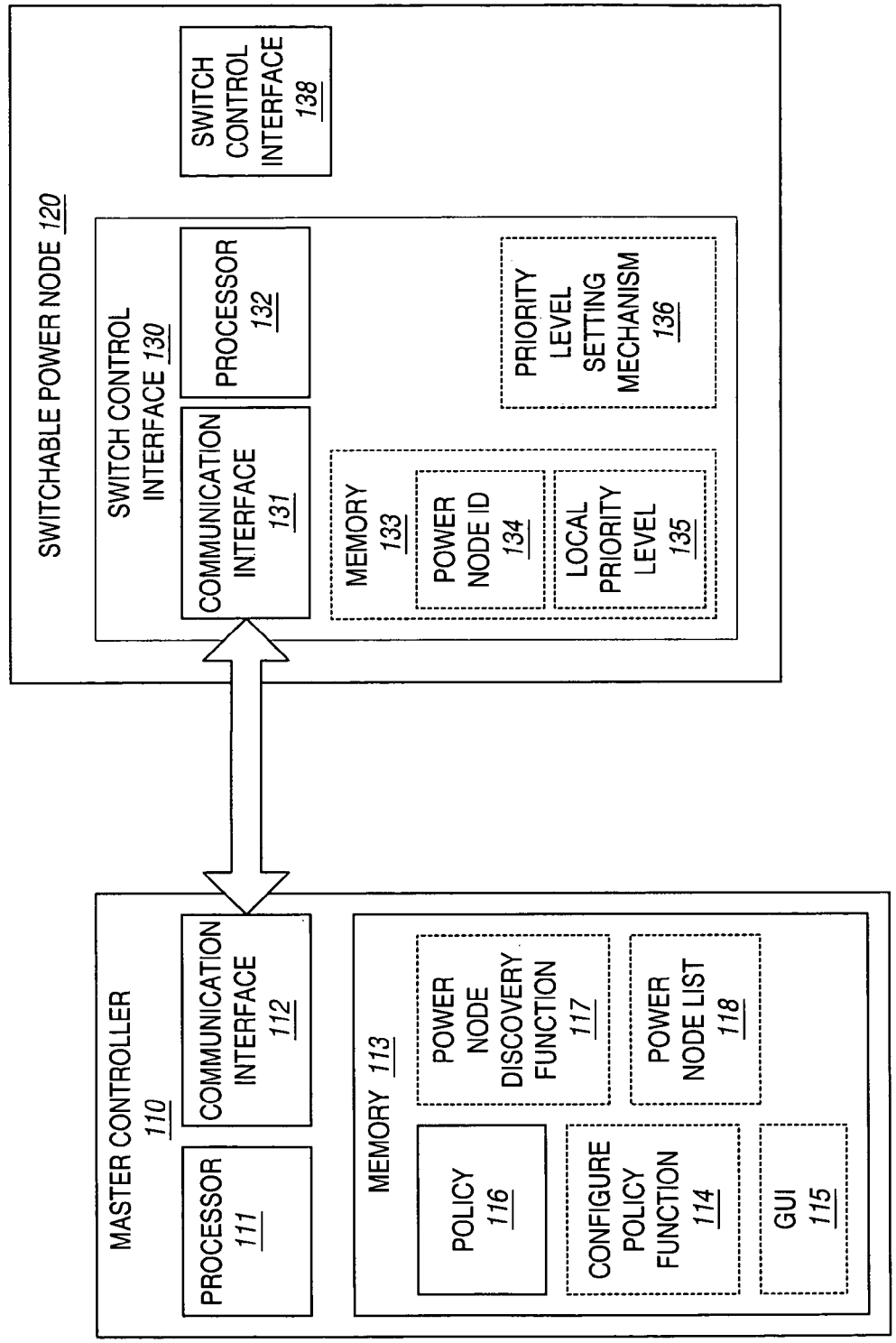
FIG. 10 is a block diagram of a portion of a dynamic power control system implementing an embodiment that allows discovery of switchable power nodes in the system.

FIG. 10 illustrates a portion of the system, including an embodiment 110 of a master controller 11 and an embodiment 120 of a switchable power node 14 which implements proactive switchable power nodes. In this embodiment, the master controller 110 (or other computer in communication with the master controller 110) includes a switchable power node discovery function 117 which actively seeks out available switchable power nodes 14a–14i in the system 10 and builds a switchable power node list 118 that includes all switchable power nodes 14a–14i in the system that are available to be monitored. The discovery function 117 may be implemented in one of several ways.

In one embodiment, if each switchable power node 14a–14i is implemented as SPN 120 with a switchable power node identifier (SPN ID) 134 (such as a Media Access Control (MAC) number or address) and a priority level setting mechanism 136 (such as 100 illustrated in FIG. 9), the discovery function 117 can visit each possible address of switchable power nodes 14a–14i (for example a range of switchable power node identifiers, where each switchable power node 14a–14i is hardwired or manually set to a different switchable power node identifier 14a–14i ). For each possible identifier (e.g., MAC address) of switchable power nodes 14a–14i , the discovery function 117 can attempt to establish a communication connection with a switchable power node 100 that has a switchable power node identifier 134 matching that of the current possible identifier of switchable power nodes. If communication is established with a switchable power node having an identifier that matches the identifier being tested, the discovery function 117 issues a read request of the local priority level 135 of that switchable power node 14a–14i . The switchable power node identifier 134 and its corresponding local priority level 135 are added to the switchable power node list 118.

In an alternative embodiment, the switchable power nodes 14a–14i may be configured to actively register with the master controller 11 upon power up or installation in the system 10. A system implementing this embodiment is discussed in detail hereinafter with respect to FIG. 11.

Referring back to FIG. 10, once a switchable power node list 118 has been built, the master controller 110 has the information it needs (i.e., the power node address) for communicating with each of the active switchable power nodes 14a–14i . In the above described embodiments, after the discovery process, the master controller 110 also has the local priority levels 135 of each of the active switchable power nodes 14a–14i.

In yet another embodiment, the master controller 11 may be configured to set the local priority levels of the switchable power nodes 14a–14i in the system 10, for example if the switchable power nodes 14a–14i are not configured with a priority level setting mechanism 109 or if it is desired to allow the master controller 11 to be able to override the manual settings of the priority level setting mechanisms 109 at those switchable power nodes 14a–14i . In this embodiment, using the switchable power node list 118, the master controller 110 can visit each active switchable power node 14a–14i , and actively set its local priority level 135, and/or simply set the local priority level information associated with each switchable power node 14a–14i in the switchable power node list 118.

In yet another embodiment, the local priority levels 135 of each of the switchable power nodes 14a–14i may be set by a system administrator through a graphical user interface 115 (implemented either on the master controller 110 or on another computer that communicates with the master controller 110). The graphical user interface (GUI) 115 can be very simple, allowing the system administrator to enter the switchable power node identifier 134 and an associated local priority level 135 for each switchable power node 14a–14i in the system, or it can be more complex, integrating the discovery function 117 and switchable power node list 118 to have the system find all available switchable power nodes 14a–14i and their identifiers in the system, present them to the administrator, and allow the administrator to set or change the current local priority levels 135 of the various switchable power nodes 14a–14i in the system 10. To assist with identification of the switchable power nodes 14a–14i , the GUI 115 may allow the system administrator to enter identifying information such as meaningful text that identifies the physical location of the node in the sub-network or devices serviced by the node in the sub-network.

d. Policy Configuration

The policy 12 includes a set of rules or other meaningful data that allows the master controller 11 to dynamically effect system configuration (i.e., controlling the switchable power nodes 14a–14i ) in the system 10 in response to realtime utility information 8. The policy 12 will typically be in the form of a data file in memory that the master controller processor reads; however, it may also be implemented as an Application Specific Integrated Circuit (ASIC) or other hardware circuit. An example embodiment of a power usage policy file 30 implementing the policy 12 was described previously with respect to FIG. 4B.

If the policy 12 is implemented as a data file, the data file may be fixed by some entity such as the utility company 3, a homeland security agency (not shown), or a commercial entity. If the data file is fixed, it is not configurable by individual system users, and may simply be loaded into a computer memory accessible by the master controller 11 or other computer node in communication with the master controller 11.

However, it may be advantageous to allow individual system administrators to configure the policy 12 specific to their own system 10. In this case, the system administrator may be required to manually (i.e., via a computer text editor) generate the data file implementing the policy 12 according to a specific format. Preferably, however, the system 10 includes a configuration policy function 114 integrated with a graphical user interface 115 that allows the system administrator to configure the policy 12 automatically through a user-friendly interface.

e. Specific Embodiment

Figure 11:
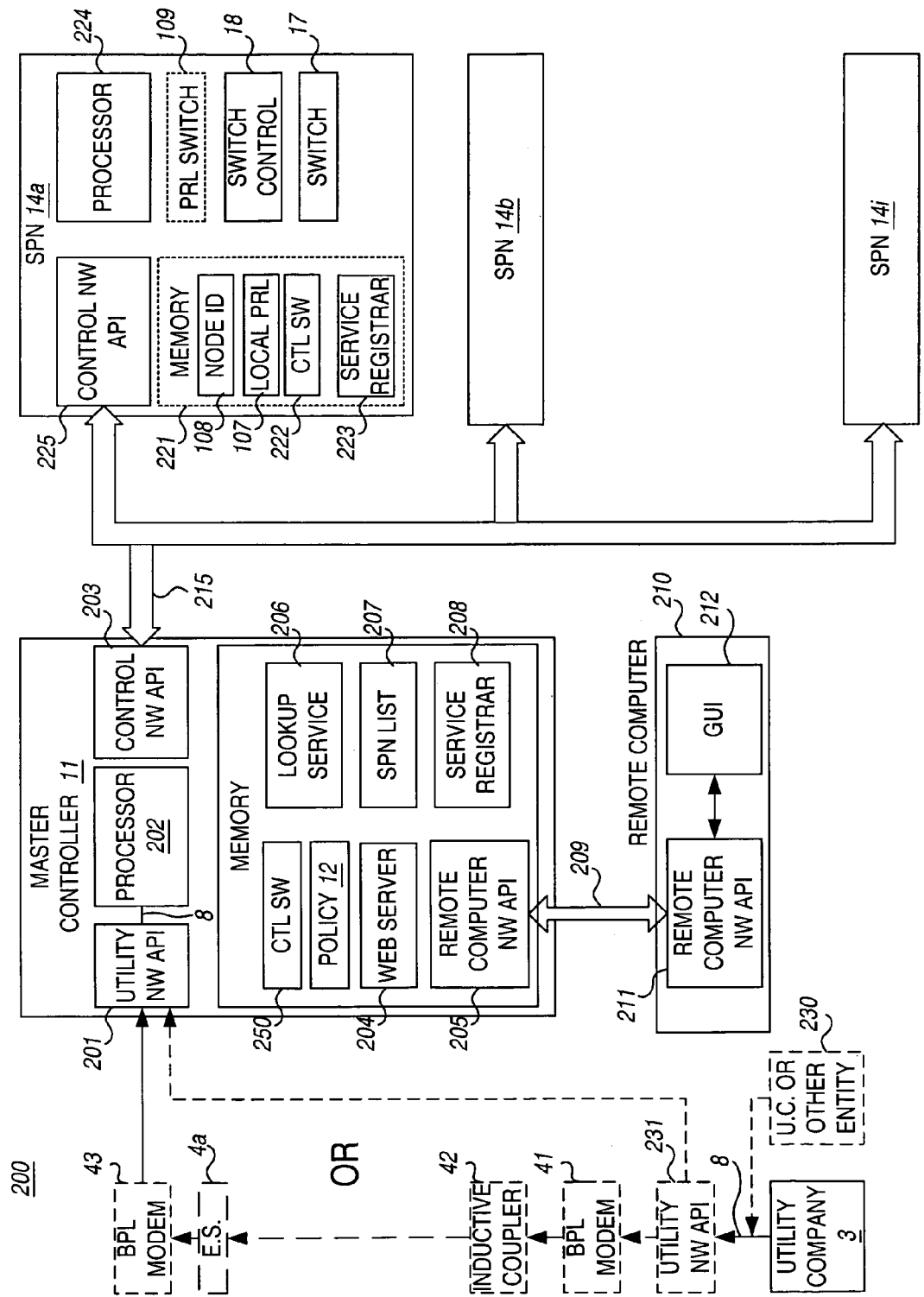
FIG. 11 is a schematic block diagram of a preferred specific embodiment of a dynamic power control system that implements a registration and lookup service for routing messages between the master controller and switchable power nodes.

FIG. 11 is a schematic block diagram of a preferred specific embodiment of a dynamic power control system 200 implemented according to the principles of the invention.

Figure 9:
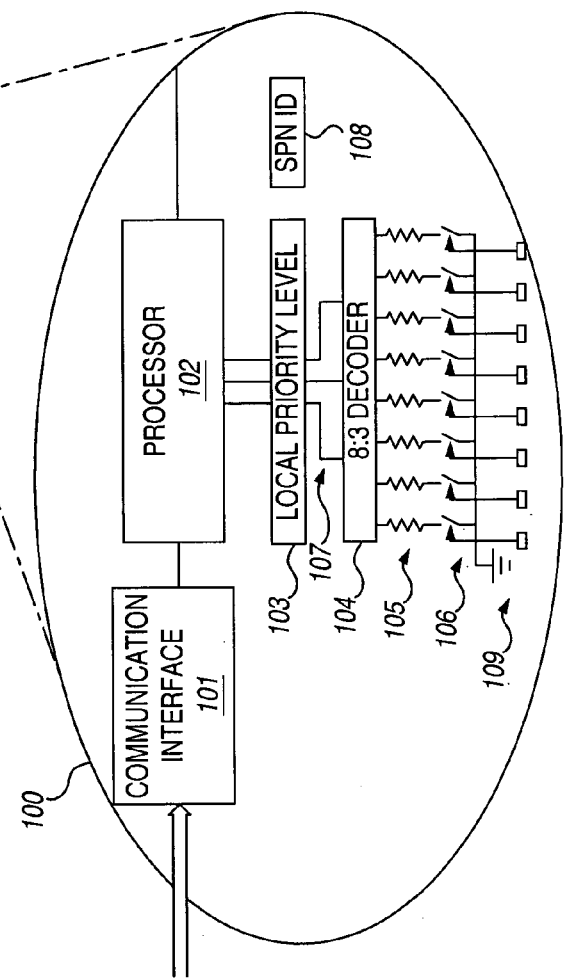
FIG. 9 is a schematic block diagram of a priority level setting mechanism for a switchable power node.

In the preferred embodiment 200, each of the switchable power nodes 14a–14i preferably includes a priority level setting mechanism 109, such as that described with respect to FIG. 9, to allow manual local priority level setting at each node. In addition, each switchable power node 14a–14i includes a local switchable power node identifier 108 which uniquely identifies its respective switchable power node 14a–14i within the system 200.

The master controller 11 and switchable power nodes 14a–14i include software that implements a lookup service 206 (for example, a Jini™ lookup service using the Psynaptic™ JMatos™ lookup service such as that described in Smith, L., Roe C., and Knudsen K., "A Jini™ Lookup Service for Resource-constrained Devices", presented at the 4th IEEE International Workshop on Networked Appliances, Jan. 15–16, 2002, incorporated by reference for all that it teaches) to allow dynamic discovery and registration as switchable power nodes 14a–14i are added or removed from the system. To this end, each control node (master controller 11 and switchable power nodes 14a–14i ) discovers and registers with the lookup service 206 (e.g., discovers and registers with the master controller's JINI® lookup service using the JINI protocols). The control nodes 11 and 14a–14i provide objects to the lookup service 206 that behave as remote proxies to the respective nodes, providing the ability for the master controller 11 to access the objects on the switchable power nodes 14a–14i and vice versa. Thus, when methods or functions are called on a remote proxy, the effects of those methods or functions are executed on the node providing the service.

When the master controller 11 is initialized, it registers with the lookup service (LUS) 206 (e.g., implemented, for example, using a Unicast Request/Response to/from a Jini™ LUS, described in The Jini™ Technology Core Platform Specification, The Jini™ Architecture Specification and related documentation, all developed, published, and made available by Sun Microsystems, Inc. of Santa Clara, Calif., and which is incorporated by reference for all that it teaches). Once registered, the master controller creates a service registrar 208 on the master controller 11 through which all subsequent messages from the master controller 11 are broadcast to the various switchable power nodes 14a–14i through the LUS 206. When a switchable power node 14a–14i is added to the system (either at power up or reset of the switchable power node), it registers with the lookup service 206 (for example, using a Unicast Request/Response to/from the Jini™ LUS 206). Once registered, a switchable power node 14a–14i creates a local service registrar 223 in its local memory 221. All messages received from the master controller 11 and sent to the master controller 11 are then handled by LUS 206. Accordingly, in this embodiment, the LUS 206 is used to allow dynamic addition and removal of switchable power nodes 14a–14i in the dynamic power control system 200 monitoring a power sub-network of a power grid. The master controller 11 may register for event notification (for example, the addition/removal of an switchable power node 14a–14i ) to allow it to update the switchable power node list 207 of active switchable power nodes 14a–14i and their associated local priority levels 207.

In the preferred embodiment, the communication link 215 between the master controller 11 and switchable power nodes 14a–14i is preferably a TCPIP network protocol layered over either a wireless (e.g., Bluetooth 802.11 standard) or a wired (e.g., Ethernet standard) physical transport layer. Accordingly, each of the master controller 11 and switchable power nodes 14a–14i includes a local control network API 203 and 225, respectively, that allows sending and receiving of information over the communication link 215.

The system 200 also includes a remote computer 210 that communicates with the master controller 11 via a communication link 209 implemented, for example, using an HTML protocol layered over a TCPIP network protocol layered over either a wireless (e.g., Bluetooth 802.11 standard) or a wired (e.g., Ethernet standard) physical transport layer. Accordingly, each of the remote computer 210 and master controller 11 includes a remote computer network API 211 and 205, respectively, that allows exchange of information over the communication link 209.

The master controller 11 includes a web server 204 for configuring the policy 12 and displaying/setting local priority levels 207 of the switchable power nodes 14a–14i monitored by the system 200. The web server 204 serves up web pages to a graphical user interface 212 implemented on the remote computer 210.

The web server 204 may include a configure policy interface that allows a system administrator to customize the policy 12 to the specific configuration of the switchable power nodes 14a–14i of the sub-network being monitored. Customized policy configuration values may be written to a data file implementing the policy 12. For example, given the example policy data file 30 of FIG. 4B, the web server 204 may serve up web pages to the graphical user interface 212 that allows the system administrator to change the electricity rate ranges and/or priorities associated with those ranges.

The web server 204 may also include a configure local priority level interface that allows the system administrator to display and edit the local priority levels of the various monitored switchable power nodes 14a–14i .

The web server 204 may also include a configure switchable power node interface that allows the system administrator to add and remove switchable power nodes 14a–14i from the system.

It will of course be appreciated by those skilled in the art that the web server 204 may be implemented at the master controller 11 or on a remote computer that can transmit the policy 12 or policy changes to the master controller 11. In addition, it will be appreciated by those skilled in the art that the web server functionality may be alternatively implemented, for example, using well-known client-server methodologies such as socket connections and SNMP.

To receive utility information 8 from either a utility company 3 or another entity 230, the master controller 11 includes a utility network application program interface (API) 201. In the preferred embodiment, the utility information 8 is converted from a local format at the utility company 3 or other entity 230 to a network protocol. In one illustrative embodiment, for example, the utility information 8 is sent via network protocol using a network transport layer such as TCPIP, Novell IPX or SPX, ATM, etc. over a BPL physical transport layer via a utility network API 231 and a BPL modem 41. The signal is then coupled onto the power lines of the power grid serviced by the utility company 3 by way of an inductive coupler 42. At the power sub-network in which the dynamic power control system of the invention is implemented, a BPL modem 43 converts the BPL signals present on the power lines of the grid to a local format by way of a utility network API 201, and the utility information 8 is extracted.

In an alternative illustrative embodiment, the utility information 8 is sent via a network protocol using a network transport layer such as TCPIP, Novell IPX or SPX, ATM, etc. over a wireless physical transport layer such as Bluetooth 802.11 or wired physical transport layer such as DSL or High-Speed Cable Internet. The signal is then converted to a local format by the utility network API 201 and the utility information 8 extracted.

In operation, the local priority levels of the switchable power nodes 14a–14i in the system are added to the sub-network system and configured either actively via the configure local priority level interface and configure switchable power node interface described above, or automatically via the dynamic registration and lookup service described above. The policy 12 is either fixed and loaded into accessible memory, or loaded and configured via the configure policy interface described above.

After system configuration, utility information 8 is received by the master controller 11. The processor 202 executes control software 250 that processes incoming utility information 8. In the preferred embodiment, if the utility information contains status information (e.g., electricity rate information), the control software 250 accesses the policy 12 and acts according to rules defined within the policy 12. If the policy dictates a change in the current configuration of the switchable power nodes 14a–14i in the system 200 based on the status information contained in the utility information 8, the control software 250 generates an appropriate configuration change event message to be broadcast by the lookup service 206. The service registrars of each of the switchable power nodes 14a–14i registered with the lookup service 206 then receive notification of the configuration change. For example, the configuration change event message may contain merely the minimum priority level that any given switchable power node should provide power to their serviced devices. Thus, if the minimum priority level announced in the configuration change event is for example, "4", then all switchable power nodes 14a–14i receive notification of the minimum priority level, and their local control software 222 effects actuation of the respective switch 17 of the respective switchable power node 14a–14i to ensure that if the local priority level 107 is at or above the minimum priority level, the switch is in the "connected" position, and if the local priority level 107 is below the minimum priority level, the software is in the "disconnected" position.

If the utility information 8 contains a control directive (e.g., emergency shut-off/turn-back-on information), the control software 250 overrides the policy 12 and acts according to rules defined by emergency or utility standards requirements. If the control directive dictates a change in the current configuration of the switchable power nodes 14a–14i in the system 200, the control software 250 generates an appropriate configuration change event message to be broadcast by the lookup service 206, and the change is effected in the same way it is effected for configuration changes based on mere status change information, as described above.

F. Summary

The dynamic power control system for power grid sub-networks described in detail above affords several advantages over the prior art. First, the system allows dynamic power usage in a given sub-network based on realtime changes in electricity rate information. This allows a sub-network to take advantage of changes in electricity rates to power certain devices in times of low electricity demand (and hence, typically lower rates) but disallow use of the devices during periods of high demand (and hence, typically higher rates). It also naturally actively forces reduction in demand for electricity as the natural demand for electricity increases, helping to prevent power blackout situations. Finally, certain configurations of the system allow absolute command directives from the utility companies or other entities (such as Homeland Security Agencies) to force immediate reduction in power usage throughout the system for use in emergencies to avoid blackout situations.

The invention is extremely versatile in that it may be implemented according to any number of different ways. In summary, what is required is a number of switchable power nodes that service devices of varying power priority levels, a master controller that can effect turning on or off of power supplied to devices serviced by the various switchable power nodes, a communication link between the utility company or other entity and a master controller of a local sub-network, a rule-based policy describing switchable power node configuration requirements based on possible incoming utility information, and a communications link between the master controller and each of the switchable power nodes to allow the master controller to control turning on or off power to the devices serviced by their respective switchable power nodes.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A dynamic power control system for a power network, comprising:
one or more switchable power nodes, each having an associated priority level and each comprising a switch element that operates in a first state to electrically couple a first subset of a plurality of power lines and a second subset of said plurality of power lines and that operates in a second state to electrically isolate said first subset of said plurality of power lines from said second subset of said plurality of power lines, and a switch actuator that actuates said switch element to a switch state, said switch state comprising one of said first state, said second state, and zero or more additional states;
a control function which receives utility information that is associated with one of a plurality of system priority levels each of which is associated with one of a plurality of switch state configurations of said respective switch states of said one or more switchable power nodes in said power network, and effects actuation of said respective switch actuators of corresponding one or more of said one or more switchable power nodes that require actuation to comply with said respective switch state configuration associated with said received utility information; and
a switchable power node configuration setting function for setting said respective priority levels respectively associated with said respective one or more switchable flower nodes.

2. The dynamic power control system of claim 1, wherein: said utility information comprises electricity rate information.

3. The dynamic power control system of claim 1, wherein: said utility information indicates a present level of available power to said system.

4. The dynamic power control system of claim 1, wherein: said control function receives a command to effect compliance with one of said plurality of switch state configurations; and
said control function effects actuation of said respective switch actuators of corresponding respective one or more switchable power nodes, if any, that require a respective change in said respective switch state to comply with said one of said plurality of switch state configurations without regard to said respective associated priority levels of said one or more switchable power nodes.

5. The dynamic power control system of claim 1, wherein: said control function actively determines which, if any, of said respective one or more switchable power nodes requires a respective change in its respective switch state in order to comply with said respective switch state configuration associated with said received utility information, and effects actuation of said respective switch actuators, if any, of said respective one or more switchable power nodes that require said respective change in its respective switch state to comply with said respective switch state configuration associated with said received utility information.

6. The dynamic power control system of claim 1, wherein:
each of said one or more switchable power nodes comprises a respective local control function which determines whether a respective change in said respective switch state of said respective switch element is required based on said respective switch state configuration associated with said received utility information and said respective priority level associated with said respective switchable power node, and which effects actuation of said respective actuator of said respective switch element to change said respective switch state of said respective switch element if said respective change in said respective switch state is determined to be necessary.

7. The dynamic power control system of claim 1, wherein:
the plurality of system priority levels comprises at least three system priority levels each of which is associated with different ones of the plurality of switch state configurations.

8. The dynamic power control system of claim 1, wherein:
said switchable power node configuration sailing function comprises a respective local priority level setting function at each of said switchable power nodes for setting said respective priority levels respectively associated with said respective one or more switchable power nodes.

9. The dynamic power control system of claim 8, wherein:
said respective local configuration setting function comprises a mechanical switch element that allows selling of said respective priority level associated with said respective switchable power node.

10. The dynamic power control system of claim 1, wherein:
said switchable power node configuration setting function comprises a web server that obtains priority level information from a user and communicates with said one or more switchable power nodes to set said respective priority levels associated with said respective one or more switchable power nodes based on said obtained priority level information.

11. The dynamic power control system of claim 1, wherein:
said switchable power node configuration selling function is remote from said respective one or more switchable power nodes.

12. The dynamic power control system of claim 11, wherein:
said switchable power node configuration setting function comprises a web server that Obtains priority level information from a user and uses said obtained priority level information to configure said respective priority levels associated with said respective one or more switchable power nodes.

13. The dynamic power control system of claim 1, further comprising:
a policy configuration function for configuring associations between a plurality of possible utility information for receipt by said control function and said plurality of system priority levels, and/or configuring associations between said plurality of system priority levels and said respective one or more switch state configurations of said respective switch states of said switchable power nodes in said power network, and/or configuring said respective one or more switch state configurations of said respective switch states of said switchable power nodes in said power network; and
wherein said control function associates said received utility information with an associated system priority level and associates said associated system priority level with an associated switch state configuration in accordance with said configured associations between said plurality of possible utility information and said plurality of system priority levels, and/or said configured associations between said plurality of system priority levels and said respective one or more switch state configurations, and/or said configured respective one or more switch state configurations of said respective switch states of said switchable power nodes in said power network.

14. The dynamic power control system of claim 13, wherein:
said policy configuration function comprises a web server that obtains configuration information from a user and uses said obtained configuration information to configure said system.

15. The dynamic power control system of claim 1, further comprising:
a utility information communication interface comprising a data communication channel implemented over an active power line coupled to said dynamic power control system which receives said utility information over said communication channel.

16. The dynamic power control system of claim 1, further comprising:
a utility information communication interface comprising a data communication channel over which said utility information is transmitted from a utility information generator.

17. A method for dynamically controlling power usage in a power network, said method comprising the steps of:
receiving utility information;
associating said utility information with one of a plurality of system priority levels;
associating said one of said plurality of system priority levels with one of a plurality of switch state configurations each representing a particular configuration representing respective switch states of one or more switchable power nodes in said power network, each said one or more switchable power nodes having an associated priority level and comprising a switch element that operates in a first state to electrically couple a first subset of a plurality of power lines and a second subset of said plurality of power lines and that operates in a second state to electrically isolate said first subset of said plurality of power lines from said second subset of said plurality of power lines, and a switch actuator that actuates said switch element to a switch state, said switch state comprising one of said first state, said second state, and zero or more additional states; and
effecting actuation of said respective switch actuators of corresponding one or more of said one or more switchable power nodes that require actuation to comply with said respective switch state configuration associated with said one of said priority levels that is associated with said received utility information.

18. The method of claim 17, wherein:
said utility information comprises electricity rate information.

19. The method of claim 17, wherein:
said utility information indicates a present level of available power to said system.

20. The method of claim 17, wherein:

said utility information comprises a command to effect compliance with one of said plurality of switch state configurations; and said step of effecting actuation comprises effecting actuation of said respective switch actuators of corresponding respective one or more switchable power nodes, if any, that require a respective change in said respective switch state to comply with said one of said at least three switch state configurations without regard to said respective associated priority levels of said one or more switchable power nodes.

21. The method of claim 17, wherein said step for effecting actuation further comprises:

actively determining which, if any, of said respective one or more switchable power nodes requires a respective change in its respective switch state in order to comply with said respective switch state configuration associated with said received utility information; and effects actuation of said respective switch actuators, if any, of said respective one or more switchable power nodes that require said respective change in its respective switch state to comply with said respective switch state configuration associated with said received utility information.

22. The method of claim 17, wherein said step for effecting actuation further comprises:

informing said one or more switchable power nodes of said respective switch state configuration associated with said received utility information;

wherein each of said one or more switchable power nodes respectively comprises a respective local control function which determines whether a respective change in said respective switch state of said respective switch element is required based on said respective switch state configuration associated with said received utility information and said respective priority level associated with said respective switchable power node, and which effects actuation of said respective actuator of said respective switch element to change said respective switch state of said respective switch element if said change in said respective switch state is determined to be necessary.

23. The method of claim 17, further comprising:

configuring at least one of a plurality of configuration parameters, said plurality of configuration parameters including one or more of;

(a) associations between a plurality of possible utility information for receipt by said control function and said plurality of system priority levels, (b) associations between said plurality of system priority levels and said respective one or more switch state configurations of said respective switch states of said switchable power nodes in said power network, (c) said respective one or more switch state configurations of said respective switch states of said switchable power nodes in said power network, and (d) said respective priority levels respectively associated with said respective one or more switchable power nodes.

24. The method of claim 17, wherein:

the plurality of system priority levels comprises at least three system priority levels each of which is associated with different ones of the plurality of switch state configurations.

25. A computer readable storage medium tangibly embodying program instructions which, when executed by a computer, implements a method for dynamically controlling power usage in a power network, said method comprising the steps of:

receiving data input that represents utility information;

associating said utility information with one of a plurality of system priority levels;

associating said one of said plurality of system priority levels with one of a plurality of switch state configurations each representing a particular configuration representing respective switch states of one or more switchable power nodes in said power network, each said one or more switchable power nodes having an associated priority level and comprising a switch element that operates in a first state to electrically couple a first subset of a plurality of power lines and a second subset of said plurality of power lines and that operates in a second state to electrically isolate said first subset of said plurality of power lines from said second subset of said plurality of power lines, and a switch actuator that actuates said switch element to a switch state, said switch state comprising one of said first state, said second state, and zero or more additional states; and generating computer instructions to effect actuation of said respective switch actuators of corresponding one or more of said one or more switchable power nodes that require actuation to comply with said respective switch state configuration associated with said one of said priority levels that is associated with said received utility information.

26. The computer readable storage medium of claim 25, wherein:

the plurality of system priority levels comprises at least three system priority levels each of which is associated with different ones of the plurality of switch state configurations.

* * * * *